United States Patent [19]

Suzuki

[11] Patent Number: 4,533,920
[45] Date of Patent: Aug. 6, 1985

[54] INK-JET RECORDING METHOD

[75] Inventor: Eiichi Suzuki, Tokyo, Japan

[73] Assignee: Canon Kabushiki Kaisha, Tokyo, Japan

[21] Appl. No.: 614,771

[22] Filed: May 29, 1984

[51] Int. Cl.³ .................. G01D 15/18; C09D 11/00
[52] U.S. Cl. ................... 346/1.1; 346/140 R; 106/22
[58] Field of Search .............. 346/1, 140 R, 140 IJ, 346/140 PD; 106/20, 22

[56] References Cited

U.S. PATENT DOCUMENTS

| | | | |
|---|---|---|---|
| 3,718,605 | 2/1973 | Storm | 106/22 X |
| 4,155,768 | 5/1979 | Adams et al. | 106/22 X |
| 4,177,075 | 12/1979 | Mansukhani | 106/22 X |
| 4,192,841 | 3/1980 | Robertson et al. | 106/22 X |
| 4,239,543 | 12/1980 | Beasley | 106/22 |
| 4,352,691 | 10/1982 | Owatari et al. | 106/22 X |
| 4,407,882 | 10/1983 | Hauser et al. | 106/22 X |
| 4,421,559 | 12/1983 | Owatari | 106/22 X |

FOREIGN PATENT DOCUMENTS 0704974 9/1977 U.S.S.R. .................. 106/22

Primary Examiner—George H. Miller, Jr.
Attorney, Agent, or Firm—Fitzpatrick, Cella, Harper & Scinto

[57] ABSTRACT

A method for ink jet recording comprises using inks of one or more colors and a plurality of inks different in dye concentration being used for each color.

The pH of the inks for each color satisfies the following relation, $$0.85 \leq \text{pH min/pH max}$$

where pH min is the minimum value of pH of the inks for each color and pH max is the maximum value of pH of the inks for said color.

5 Claims, 6 Drawing Figures

INK-JET RECORDING METHOD

BACKGROUND OF THE INVENTION

1. Field of the Invention

The present invention relates to an ink-jet recording method that comprises causing flying ink (recording liquid) droplets to adhere onto recording media, thereby forming color images. More particularly, the invention relates to an ink-jet recording method using inks having different dye concentrations for recording full-color images with a wide variety of color reproduction and with good gradation.

2. Description of the Prior Art

Ink-jet recording method comprises (i) producing ink droplets by a technique for discharging inks, such as the electrostatic attraction technique based on the application of high voltage, the technique of causing mechanical vibration or displacement of the ink by means of piezoelectric elements, or the technique of heating the ink to foam instantaneously and utilizing the foaming pressure, and (ii) causing the ink droplets to adhere to recording media such as paper. This recording method is noticed in that it generates limited noises and permits high speed recording.

When color images delicate in shade or tinct like those in silver salt photographs are formed by ink-jet recording, the density gradations of various colors in the images are expressed in the conventional ink-jet recording as follows: Using inks of colors, e.g. cyan, magenta, yellow, and black, the diameter and number (per unit area) of the ink dots to be formed on recording media are controlled for color mixing, according to the densities of three primary color components in the original images to be recorded.

However, according to this method of recording with varying the diameter and number of ink dots, it is impossible to express such gradations that image density gradually varies over the entire area of from the lowest to the highest density according to original images but to reproduce low resolution images or unnatural images.

Various ink-jet recording techniques have been proposed to solve these problems. Among these, techniques of recording by use of at least two inks of different dye concentrations for each color are known from Japanese patent application Kokai No. 156264/82 and other literature.

In particular, the ink-jet recording technique disclosed in the above Japanese patent application Kokai is characterized in that; a plurality of inks of different dye concentrations are used for each of colors, the diameter and number of the ink dots to be formed are varied according to the density levels in the original image, and at the same time dots of one of the inks lower in dye concentration are mixed over almost the entire area of from low to high density of the image to be recorded. According to this technique, the density gradations of each color can be better expressed, particularly at lower image density areas, than according to the conventional technique.

In such recording techniques, however, ink properties such as viscosity, surface tension, and pH are considerably varied from ink to ink with the difference of dye concentration among plural inks, since the inks of the same color and of different dye concentrations are prepared by dissolving a dye in different concentrations in the same composition of solvents.

In particular, pH is a factor affecting the color of ink, and when one and the same dye is used at different pH conditions, the resulting color of the ink is different from each other. Therefore, when a single dye is used to produce a plurality of inks having different dye concentrations, the fluctuation of pH among the inks results in the fluctuation of color among the inks. Such inks produce images with a very unnatural feeling.

SUMMARY OF THE INVENTION

An object of the present invention is to provide an ink jet recording method comprising using a plurality of inks of the same color having different dye concentrations, capable of producing a continuously and smoothly varying density gradation over a wide range of density to be recorded which is free from the above-mentioned drawbacks.

Another object of the present invention is to provide the ink jet recording method capable of producing ink dots of the same color and different densities free from fluctuation of color regardless of the difference in dye concentration of the inks.

A further object of the present invention is to provide the ink jet recording method capable of producing images of high quality.

According to the present invention, there is provided a method for ink jet recording which comprises using inks of one or more colors and a plurality of inks different in dye concentration being used for each color, characterized in that the pH of the inks for each color satisfies the following relation, $$0.85 \leq pH\ min/pH\ max$$

where pHmin is the minimum value of pH of the inks for each color and pHmax is the maximum value of pH of the inks for said color.

DESCRIPTION OF THE PREFERRED EMBODIMENTS

According to the method of the present invention, in the case of recording by using a single color ink there are used inks of said desired color while in the case of effecting recording of multicolor images there are used inks of 3-4 primary colors, for example, cyan, magenta, yellow and black, and the diameter and number of ink dots of each color are controlled depending on the color of the original images so as to mix the colors of inks.

The inks used in the present invention comprises a dye as a component of a recording agent and a solvent such as water and a mixture of water and a water-soluble solvent.

Dyes for the recording agent component can be selected from those generally used for ink-jet recording inks. In the method of the invention, a plurality of inks different in dye concentration are used for each color to display gradations of image density varying continuously and smoothly over a wide range. These plural inks can be prepared by dissolving dyes in different concentrations, and for each color, are desirably prepared by dissolving a single dye in different concentrations. The reason to use a single dye for one color is that if two or more dyes of the same color are used, there occurs color discrepancy due to the different kinds of dyes used and further the difference in light resistant property between the dyes causes color discrepancy with the lapse of time.

The concentrations of a dye usually range from 0.1 to 4.0% by weight. Preferably a dye is used in three or more different concentrations of about 0.3%, 0.7%, 3.0%, and so forth, by weight for one color.

The pH of the ink used in the present invention may be adjusted by changing the amount of a pH controlling agent in the ink composition depending upon the concentration of a dye in the ink, and the pH is usually adjusted to a certain range where the ink is stable, such as pH8–pH11, preferably pH8–pH10.

This "certain range" means a distribution range of pH at which inks of the same color and having dye concentrations different from each other do not give fluctuation of color between the recorded ink dots. According to the present invention, the pH of inks of the same color satisfies the relation, $$0.85 \leq \text{pH min/pH max, preferably } 0.9 \leq \text{pH min/pH max}$$

where pH min is the minimum value of pH of the inks of the same color and pH max is the maximum value of pH thereof.

As shown in Comparative Examples (infra), when inks of the same color are prepared by simply changing the dye concentration in the same solvent, the value of pH min/pH max is usually about 0.8 and the color of the recorded ink dots has a fluctuation, and therefore the quality of the resulting images is poor. Furthermore, the resulting pH of the ink is sometimes outside of a pH range where the ink is stable, and sometimes there occurs decomposition or crystallization of the recording agent resulting in clogging of the orifice, or color changing or fading, and as a result, the storage stability of the ink is low.

As a pH controlling agent, there may be used any one as far as it can adjust pH of the inks without deteriorating the recording characteristics and storage stability of the inks. For example, there may be used acids, bases, acidic salts, basic salts, buffer agents and the like. Preferable pH controlling agents are urea, amines such as triethanolamine, diethanolamine, ethanolamine and the like, ammonia, ammonium hydroxide, and alkali metal hydroxides such as sodium hydroxide, potassium hydroxide and the like. These are used alone or in combination.

As a solvent component for the ink, there may be used water or mixtures of water and water-soluble organic solvents.

Such water-soluble solvents include; $C_1$–$C_4$ alkyl alcohols, e.g. methanol, ethanol, n-propanol, isopropanol, n-butanol, sec-butanol, tert-butanol, and isobutanol; amides, e.g. dimethylformamide and dimethylacetamide; ketones or ketone alcohols, e.g. acetone and diacetone alcohol; ethers, e.g. tetrahydrofuran and dioxane; nitrogen-containing heterocyclic ketones, e.g. N-methyl-2-pyrrolidone and 1,3-dimethyl-2-imidazolidinone; polyalkylene glycols, e.g. polyethylene glycol and polypropylene glycol; alkylene glycols containing $C_2$–$C_6$ alkylene, e.g. ethylene glycol, propylene glycol, butylene glycol, triethylene glycol, 1,2,6-hexanetriol, thiodiglycol, hexylene glycol, and diethylene glycol; glycerol; and lower alkyl ethers of polyhydric alcohols, e.g. ethylene glycol methyl ether, diethylene glycol methyl (or ethyl) ether, and triethylene glycol monomethyl (or monoethyl) ether.

Of these water-miscible organic solvents, preferred are diethylene glycol, triethylene glycol monomethyl ether, and triethylene glycol monoethyl ether.

The concentration of water-soluble organic solvents in each ink is in the range of generally from 5 to 95%, preferably from 10 to 80%, particularly preferably from 20 to 50%, by weight based on the total weight of the ink.

Inks, used in the method of this invention, prepared from the components stated above are superior and well-balanced, as such, in recording characteristics (signal responsiveness, droplet formation stability, discharge stability, long term continuous serviceability, and discharge stability after a long rest), storage stability, solution stability of recording agents, fixability onto recording media, and light resistance, weather resistance, water resistance, and alcohol resistance, of recorded images.

In order to improve further these characteristics, there may be added various conventional additives to the ink.

As the additives, there may be mentioned a viscosity adjusting agent such as polyvinylalcohol, celluloses, water-soluble resins and the like, surfactant such as cationic surfactants, anionic surfactants and nonionic surfactants, and a surface tension adjusting agent such as diethanolamine, triethanolamine and the like.

In order to prepare inks for a recording method where inks are electrically charged, there may be used a specific resistance adjusting agent, for example, inorganic salts such as lithium chloride, ammonium chloride and the like. As an agent for improving a water-retaining property at the discharge orifice tip portion, there may be preferably used urea and thiourea.

In the case of a recording method where ink is ejected by an action of heat energy, the thermal characteristics such as specific heat, coefficient of thermal expansion, thermal conductivity and the like, are adjusted if necessary.

According to the method for ink jet recording of the present invention where the above mentioned inks are used, since the pH's of a plurality of inks of the same color and having different dye concentrations are almost similar, the fluctuation of color among the dots having different densities can be eliminated, and further, since a plurality of inks of the same color and having a large difference in dye concentration can be used, it is possible to express gradations of image density varying continuously and smoothly over a wide range of density. In particular, when original color images delicate in shade or tint are reproduced by using the inks of two or more colors, high quality images with natural feeling can be recorded.

The invention is illustrated in more detail with reference to the following examples and comparative examples.

EXAMPLE 1

Six kinds of ink having the same color and different dye concentrations were prepared as follows. As a recording agent component, C.I. Direct Yellow 142 was used, and added to solvents of such a composition as shown in Table 1 in the amounts of 0.1, 0.3, 0.7, 1.0, 2.0, and 4.0% by weight based on the total amount of the ink. The mixtures were stirred until the dye dissolved almost completely and filtered with pressure through 1.0μ pore size filters (supplied by Sumitomo Denko Co., Ltd. under the tradename "Fluoro Pore Filter") to obtain inks as filtrates.

To the resulting six kinds of ink of different dye concentrations was added urea to adjust the pH of the inks to desired values. The amount of urea varies depending upon the dye concentration.

TABLE 1

| Components of ink | | Composition of ink (wt. %) | | | | | |
|---|---|---|---|---|---|---|---|
| Dye | C.I. Direct Yellow-142 | 0.1 | 0.3 | 0.7 | 1.0 | 2.0 | 4.0 |
| Solvent | Water | 52.9 | 52.9 | 52.9 | 52.9 | 52.9 | 52.9 |
| | Diethylene glycol | 15.0 | 15.0 | 15.0 | 15.0 | 15.0 | 15.0 |
| | Glycerine | 15.0 | 15.0 | 15.0 | 15.0 | 15.0 | 15.0 |
| | N—methyl-2-pyrrolidone | 15.0 | 15.0 | 15.0 | 15.0 | 15.0 | 15.0 |
| Additive | Urea | 3.0 | 2.8 | 2.7 | 2.6 | 2.0 | 2.0 |
| | Emal NC* | 0.1 | 0.1 | 0.1 | 0.1 | 0.1 | 0.1 |

(*Tradename, surfactant, supplied by Kao Soap Co., Ltd.)

The pH of the inks thus adjusted was measured at 25° C. by using a digital pH meter (manufactured by Horiba Seisakusho). The result is shown in Table 2 below.

TABLE 2

| Dye concentration (wt. %) | pH |
|---|---|
| 0.1 | 8.04 |
| 0.3 | 8.10 |
| 0.7 | 8.13 |
| 1.0 | 8.27 |
| 2.0 | 8.46 |
| 4.0 | 8.60 |

Calculating the distribution range of pH of the inks, i.e. pH min/pH max, based on the data in Table 2, it is 0.94. This indicates that the pH values are distributed in a very narrow range.

The inks were tested as to whether there is fluctuation of hue between the recorded ink dots, by using the following method.

At first, one of the six inks was used to effect ink jet recording under the following conditions. Driving voltage of a piezo-vibrator was varied from 100 V to 20 V at an interval of 10 V, and the size of the recorded ink dot was continuously decreased. As a result, there were obtained recording samples where the density gradation changes gradually to the low chroma region.

| Recording Conditions: | |
|---|---|
| Diameter of discharging orifice: | 65 μm |
| Driving conditions of piezooscillator: | 100–20 V 10 μsec |
| Response frequency: | 2 KHz |
| Recording paper: Mitsubishi Ink-Jet Recording Paper M (supplied by Mitsubishi Seishi Co., Ltd.) | |
| Ink dot density: | 5 dots/mm |

In the same way as above, the other 5 kinds of ink having different dye concentrations were used and there were obtained recorded samples having density gradations corresponding to said inks.

The density gradations of the recorded samples were measured by using Color Measuring System (tradename, supplied by Shimazu Seisakusho Co., Ltd.) and calculation was effected, and curves were drawn on a Lab Chromaticity diagram. From the resulting curves, difference in hue between recorded samples, i.e. difference in hue between inks used for recording samples, was estimated.

The Lab Chromaticity diagram is that a color is represented by a point (a, b) in coordinates, and for optional two colors, the perception difference in color can be quantitatively judged as the difference between the points in the a - b coordinates.

In a Lab Chromaticity, when chroma of a color is continuously changed to a low chroma region without changing hue, the chromaticity coordinates (a, b) approach the achromatic point (0,0) and thus there is drawn a curve inherent to said color.

When diameters of ink dots of the same color are changed to record density gradation as in this example, the hue is not changed, but the chroma changes. Therefore, there is obtained a curve corresponding to the density gradation in Lab Chromaticity diagram for each recording sample. If there is not fluctuation of hue between the inks, the above mentioned curves overlap each other and converge into one curve directed to the original point. On the other hand, if there is a difference in hue between the inks, the curves directed to the original point do not overlap each other.

Three inks having dye concentrations of 0.3, 1.0 and 4.0% by weight, respectively, prepared according to this example were used to carry out ink jet recording. A Lab Chromaticity diagram obtained from the resulting recording samples is shown in FIG. 1.

Figure 1:
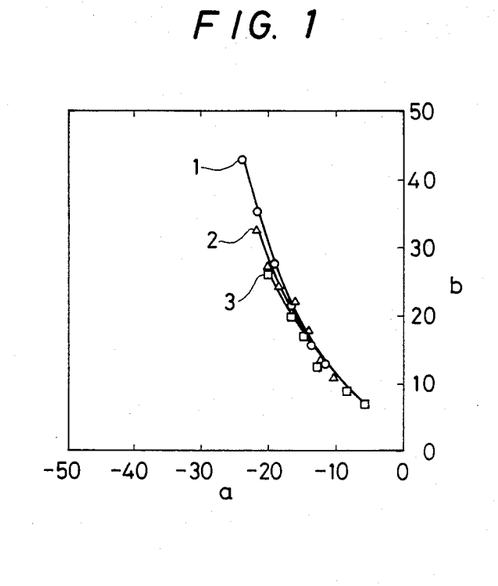
FIGS. 1–6 are Lab chromaticity diagrams showing density gradation of recording samples in Examples 1-3 and comparative Examples 1-3, respectively.

In FIG. 1, curves 1, 2 and 3 represent a sample recorded by the ink of a dye concentration of 4.0% by weight, a sample recorded by the ink of a dye concentration of 1.0% by weight, and a sample recorded by the ink of a dye concentration of 0.3% by weight, respectively.

As shown in FIG. 1, curves 1, 2 and 3 almost overlap each other, and it can be judged that the hue of the inks is almost free from fluctuation. In the six kinds of ink prepared in this example, there occurred neither decomposition nor crystallization of the recording agent and the stability was very good.

EXAMPLE 2

As a recording agent, there was used C.I. Acid Blue 185 to prepare six kinds of ink having different dye concentrations according to the procedure of Example 1. The compositions of the inks are shown in Table 3. In this example, as a pH controlling agent, there was used triethanolamine which can also function as a surface tension controlling agent, and the amount of triethanolamine was varied depending on the dye concentration.

TABLE 3

| Components of ink | | Composition of ink (wt. %) | | | | | |
|---|---|---|---|---|---|---|---|
| Dye | C.I. Acid Blue 185 | 0.1 | 0.3 | 0.7 | 1.0 | 2.0 | 4.0 |
| Solvent | Water | 54.7 | 54.7 | 54.7 | 54.7 | 54.7 | 54.7 |
| | Ethylene glycol | 14.0 | 14.0 | 14.0 | 14.0 | 14.0 | 14.0 |
| | Polyethylene glycol | 16.0 | 16.0 | 16.0 | 16.0 | 16.0 | 16.0 |
| | N—methyl-2-pyrrolidone | 15.0 | 15.0 | 15.0 | 15.0 | 15.0 | 15.0 |
| Additive | Triethanolamine | 0.28 | 0.26 | 0.24 | 0.20 | 0.15 | 0.05 |
| | Emal NC | 0.1 | 0.1 | 0.1 | 0.1 | 0.1 | 0.1 |

The pH's of the inks thus prepared were measured at 25° C. according to the procedure in Example 1. The result is shown in Table 4 below.

TABLE 4

| Dye concentration (wt. %) | pH |
|---|---|
| 0.1 | 8.42 |
| 0.3 | 8.89 |
| 0.7 | 9.16 |
| 1.0 | 9.27 |
| 2.0 | 9.60 |
| 4.0 | 9.90 |

Calculating the distribution range of pH of the inks, i.e. pH min/pH max, based on the data in Table 4, it is 0.85. This indicates that the pH values are distributed in a very narrow range.

The inks were tested as to whether there is fluctuation of hue between the recorded dots, by ink jet recording according to the procedure of Example 1.

Figure 2:
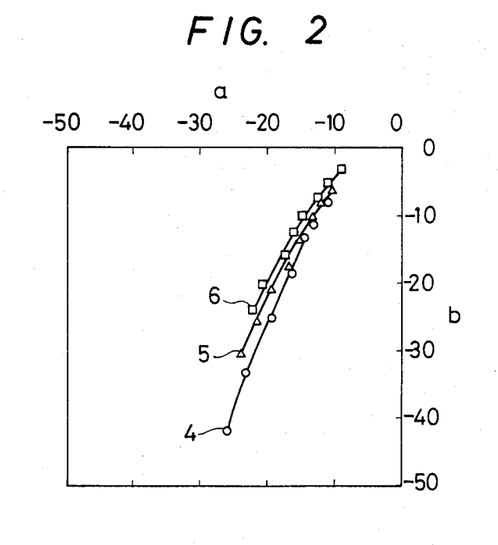

The chromaticity diagram of FIG. 2 was produced by using the recorded samples corresponding to inks of dye concentrations of 4.0, 1.0 and 0.3% by weight prepared in this example.

In FIG. 2, curves 4, 5 and 6 correspond to the recorded samples of the inks of dye concentrations of 4.0, 1.0 and 0.3% by weight, respectively.

As shown in FIG. 2, curves 4, 5 and 6 almost overlap each other, and this indicates that the hue of the inks is almost free from fluctuation. In the six kinds of ink prepared in this example, there occurred neither decomposition nor crystallization of the recording agent and the stability was very good.

EXAMPLE 3

As a recording agent, there was used C.I. Acid Red 37 to prepare six kinds of ink having different dye concentrations according to the procedure of Example 1. The ink compositions are shown in Table 5. In this example, as a pH controlling agent, there was used triethanolamine which can also function as a surface tension controlling agent, and the amount of triethanolamine added was varied dependent on the dye concentration.

TABLE 5

| Ink components | | Composition of ink (wt. %) | | | | | |
|---|---|---|---|---|---|---|---|
| Dye | C.I. Acid Red 37 | 0.1 | 0.3 | 0.7 | 1.0 | 2.0 | 4.0 |
| Solvent | Water | 54.7 | 54.7 | 54.7 | 54.7 | 54.7 | 54.7 |
| | Ethylene glycol | 14.0 | 14.0 | 14.0 | 14.0 | 14.0 | 14.0 |
| | Polyethylene glycol | 16.0 | 16.0 | 16.0 | 16.0 | 16.0 | 16.0 |
| | N—methyl-2-pyrrolidone | 15.0 | 15.0 | 15.0 | 15.0 | 15.0 | 15.0 |
| Additive | Triethanolamine | 0.35 | 0.34 | 0.30 | 0.25 | 0.20 | 0.10 |
| | Emal NC | 0.1 | 0.1 | 0.1 | 0.1 | 0.1 | 0.1 |

The pH's of the inks thus prepared were measured at 25° C. according to the method of Example 1. The result is shown in Table 6.

TABLE 6

| Dye concentration (wt. %) | pH |
|---|---|
| 0.1 | 8.22 |
| 0.3 | 8.25 |
| 0.7 | 8.28 |
| 1.0 | 8.35 |
| 2.0 | 8.45 |
| 4.0 | 8.82 |

Calculating the distribution range of pH of the inks, i.e. pH min/pH max, based on the data in Table 6, it is 0.94. This indicates that the pH values are distributed in a very narrow range.

The inks were tested as to whether there is fluctuation of hue between the recorded matters, by ink jet recording according to the procedure of Example 1.

Figure 3:
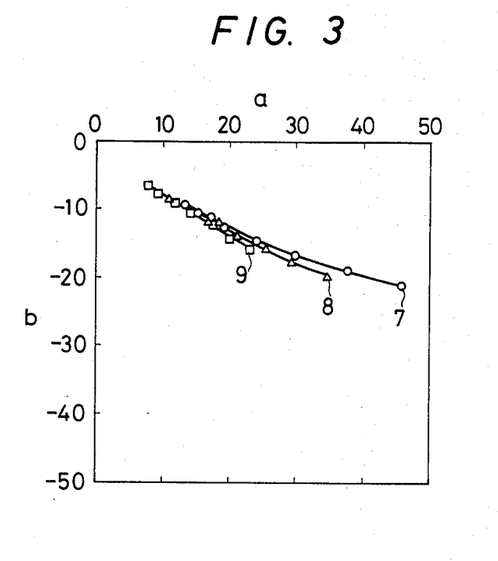

The chromaticity diagram of FIG. 3 was produced by using the recorded samples corresponding to inks of dye concentrations of 4.0, 1.0 and 0.3% by weight prepared in this example.

In FIG. 3, curves 7, 8 and 9 correspond to the recorded samples of the inks of dye concentrations of 4.0, 1.0 and 0.3% by weight, respectively.

As shown in FIG. 3, curves 7, 8 and 9 almost overlap each other, and this indicates that the hue of the inks is almost free from fluctuation. In the six kinds of ink prepared in this example, there occurred neither decomposition nor crystallization of the recording agent and the stability was very good.

COMPARATIVE EXAMPLE 1

By using the same components as in Example 1, the inks of the compositions as shown in Table 7 were prepared. The amount of urea to be added as a pH controlling agent was constant.

TABLE 7

| Ink components | | Composition of ink (wt. %) | | | | | |
|---|---|---|---|---|---|---|---|
| Dye | C.I. Direct Yellow 142 | 0.1 | 0.3 | 0.7 | 1.0 | 2.0 | 4.0 |
| Solvent | Water | | | 52.9 | | | |
| | Diethylene glycol | | | 15.0 | | | |
| | Glycerine | | | 15.0 | | | |
| | N—methyl-2-pyrrolidone | | | 15.0 | | | |
| Additive | Urea | | | 2.0 | | | |
| | Emal NC | | | 0.1 | | | |

The pH's of the six kinds of ink thus prepared were measured at 25° C. according to the method of Example 1. The result is shown in Table 8.

TABLE 8

| Dye concentration (wt. %) | pH |
|---|---|
| 0.1 | 6.90 |
| 0.3 | 7.20 |
| 0.7 | 7.62 |
| 1.0 | 7.83 |
| 2.0 | 8.27 |
| 4.0 | 8.60 |

Calculating the distribution range of pH of the inks, i.e. pH min/pH max, based on the data in Table 8, it is 0.80. This indicates the fluctuation of pH's of the inks is large. The pH values of the inks of dye concentration of 0.1-1.0% by weight are lower than the pH range where the inks are stable, i.e. pH8-pH11.

Then, ink jet recording was effected according to the method of Example 1 by using the inks thus prepared, and it was judged whether there is fluctuation of hue between the recorded matters.

Figure 4:
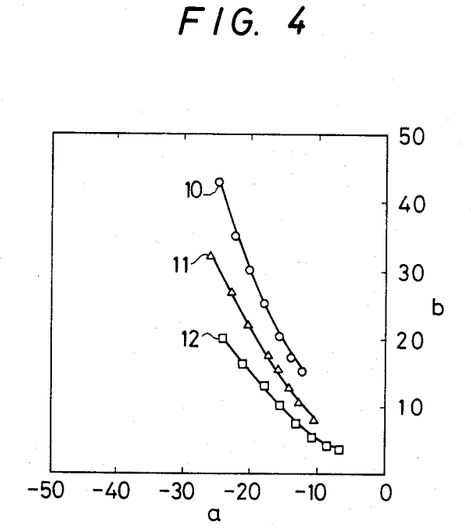

The Lab Chromaticity diagram of FIG. 4 was produced by using the recorded samples corresponding to inks of dye concentrations of 4.0, 1.0 and 0.3% by weight prepared according to this comparative example.

In FIG. 4, curves 10, 11 and 12 correspond to the recorded samples of the inks of dye concentrations of 4.0, 1.0 and 0.3% by weight, respectively.

As shown in FIG. 4, curves 10, 11 and 12 do not overlap each other, and this indicates that the hue of the inks does not consist with each other.

Among the six kinds of ink, the pH's of inks containing 1.0% by weight or less of the dye concentration are lower than the range of pH where the inks are stable, that is, pH8–pH10, as shown in Table 8. As a result, these inks lacked in storage stability, and the recording agent was decomposed, and in addition, the color changed and faded during a long time storage.

COMPARATIVE EXAMPLE 2

Inks having the compositions as shown in Table 9 were prepared by using the same components as in Example 2. The amount of triethanolamine as a pH controlling agent was constant.

TABLE 9

| Ink components | | Composition of ink (wt. %) | | | | | |
|---|---|---|---|---|---|---|---|
| Dye | C.I. Acid Blue 185 | 0.1 | 0.3 | 0.7 | 1.0 | 2.0 | 4.0 |
| Solvent | Water | | | 54.7 | | | |
| | Ethylene glycol | | | 14.0 | | | |
| | Polyethylene glycol | | | 16.0 | | | |
| | N—methyl-2-pyrrolidone | | | 15.0 | | | |
| Additive | Triethanolamine | | | 0.2 | | | |
| | Emal NC | | | 0.1 | | | |

The pH's of the six kinds of inks were measured at 25° C. according to the method of Example 1. The result is shown in Table 10.

TABLE 10

| Dye concentration (wt. %) | pH |
|---|---|
| 0.1 | 8.12 |
| 0.3 | 8.68 |
| 0.7 | 9.11 |
| 1.0 | 9.28 |
| 2.0 | 9.87 |
| 4.0 | 11.30 |

Calculating the pH distribution range of the inks, i.e. pH min/pH max, based on the data in Table 10, it is 0.72. This indicates the fluctuation of pH between the inks is very large. The pH of the ink of dye concentration of 4% by weight is higher than the range of pH8–pH11 where the inks are stable.

Then, ink jet recording was effected according to the method of Example 1 by using the inks thus prepared, and it was judged whether there is fluctuation of hue between the recorded matters.

Figure 5:
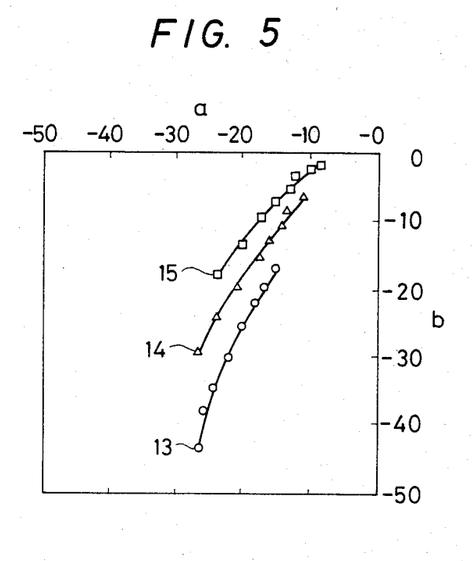

The Lab Chromaticity diagram of FIG. 5 was produced by using the recorded samples corresponding to inks of dye concentrations of 4.0, 1.0 and 0.3% by weight prepared in this comparative example.

In FIG. 5, curves 13, 14 and 15 correspond to the recorded samples of the inks of dye concentrations of 4.0, 1.0 and 0.3% by weight, respectively.

As shown in FIG. 5, curves 13, 14 and 15 do not overlap each other, and this indicates that the hue of the inks does not consist with each other.

Among the six kinds of ink, the pH of the ink of dye concentration of 4.0% by weight is higher than pH11. The color of this ink changed during a long time storage and further there was produced a matter which caused clogging.

COMPARATIVE EXAMPLE 3

By using the same components as in Example 3, the inks of Table 11 were prepared. The amount of triethanolamine as a pH controlling agent was constant.

TABLE 11

| Ink components | | Composition of ink (wt. %) | | | | | |
|---|---|---|---|---|---|---|---|
| Dye | C.I. Acid Red 37 | 0.1 | 0.3 | 0.7 | 1.0 | 2.0 | 4.0 |
| Solvent | Water | | | 54.7 | | | |
| | Ethylene glycol | | | 14.0 | | | |
| | Polyethylene glycol | | | 16.0 | | | |
| | N—methyl-2-pyrrolidone | | | 15.0 | | | |
| Additive | Triethanolamine | | | 0.2 | | | |
| | Emal NC | | | 0.1 | | | |

The pH's of the six kinds of inks prepared as above were measured at 25° C. according to the method in Example 1. The result is shown in Table 12.

TABLE 12

| Dye concentration (wt. %) | pH |
|---|---|
| 0.1 | 6.71 |
| 0.3 | 6.92 |
| 0.7 | 7.23 |
| 1.0 | 7.86 |
| 2.0 | 8.47 |
| 4.0 | 9.24 |

Calculating the distribution range of pH of the inks, i.e. pH min/pH max, based on the data in Table 12, it is 0.73. This indicates the fluctuation of pH's of the inks is very large. The pH's of inks having dye concentrations of 1.0% by weight or less are lower than the pH range where the inks are stable, i.e. pH8–pH11.

Then, ink jet recording was effected according to the method of Example 1 by using the inks thus prepared, and it was judged whether there is fluctuation of hue between the recorded matters.

Figure 6:
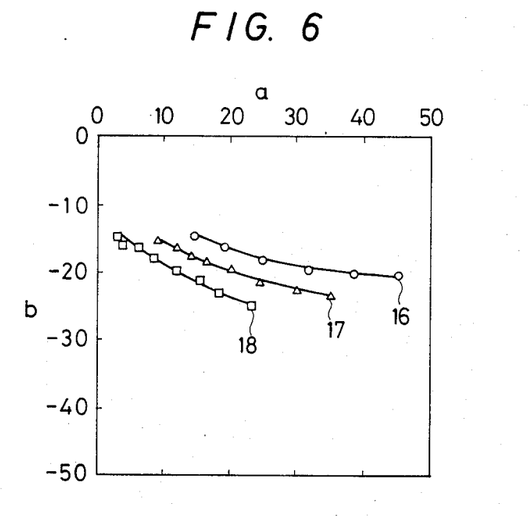

The Lab Chromaticity diagram of FIG. 6 was produced by using the recorded samples corresponding to inks of dye concentrations of 4.0, 1.0 and 0.3% by weight prepared according to this Comparative Example.

In FIG. 6, curves 16, 17 and 18 correspond to the recorded samples of the inks of dye concentrations of 4.0, 1.0 and 0.3% by weight, respectively.

As shown in FIG. 6, curves 16, 17 and 18 do not overlap each other, and this indicates that the hue of the inks does not consist with each other.

Among the six kinds of ink, the pH's of inks of 1.0% by weight or less of the dye concentration are lower than 8, and these inks faded when stored for a long time and lacked in storage stability.

Results of the above examples and comparative example are summarized is Table 13 where "+" represents that there is a fluctuation of hue of ink dots and "−" represents that there is hardly observed the fluctuation.

TABLE 13

|  | pH min / pH max | Fluctuation of hue of ink dots |
| --- | --- | --- |
| Example 1 | 0.94 | — |
| Example 2 | 0.85 | — |
| Example 3 | 0.94 | — |
| Comparative Example 1 | 0.80 | + |
| Comparative Example 2 | 0.72 | + |
| Comparative Example 3 | 0.73 | + |

As shown in Table 13, in the examples of the method of the present invention the pH's of a plurality of inks of the same color and having different dye concentration satisfy the relation, $$\text{pH min}/\text{pH max} \geq 0.85$$

regardless of the pH values in the pH reange where the inks are stable. The ink dots thus recorded have almost uniform hue.

We claim:

1. A method for ink jet recording which comprises using inks of one or more colors and a plurality of inks different in dye concentration being used for each color, characterized in that the pH of the inks for each color satisfies the following relation, $$0.85 \leq \text{pH min}/\text{pH max}$$

where pH min is the minimum value of pH of the inks for each color and pH max is the maximum value of pH of the inks for said color.

2. A method for ink jet recording according to claim 1 in which the relation is $$0.90 \leq \text{pH min}/\text{pH max}.$$

3. A method for ink jet recording according to claim 1 in which the pH of each of the inks ranges from 8 to 11.

4. A method for ink jet recording according to claim 1 in which the pH of each of the inks ranges from 8 to 10.

5. A method for ink jet recording according to claim 1 in which the ink is an aqueous ink comprising a dye and a solvent selected from the group consisting of water and a mixture of water and a water-soluble solvent.

* * * * *

UNITED STATES PATENT AND TRADEMARK OFFICE
CERTIFICATE OF CORRECTION

PATENT NO. : 4,533,920

DATED : August 6, 1985

INVENTOR(S) : EIICHI SUZUKI

It is certified that error appears in the above-identified patent and that said Letters Patent is hereby corrected as shown below:

First Page, under "Foreign Application Priority Data"
    insert --Japanese Pat. Appl. No.
        100026 /1983, June 4, 1983--

Column 2, line 58, change "comprises" to --comprise--
Column 3, line 30, change "(infra)" to --(_infra_)--
Column 10, line 65, change "is" to --in--
Column 11, line 18, change "reange" to --range--.

Signed and Sealed this

Eighth Day of July 1986

[SEAL]

Attest:

DONALD J. QUIGG

Attesting Officer      Commissioner of Patents and Trademarks